March 11, 1969 L. D. MEGEL 3,432,426
OIL PROCESSOR APPARATUS AND METHOD OF SEPARATING
OIL MIXTURE COMPONENTS
Filed Feb. 24, 1966

INVENTOR.
LAURENCE D. MEGEL
BY
John H. Widdowson
ATTORNEY

INVENTOR.
LAURENCE D. MEGEL
BY
John H. Widdowson
ATTORNEY

# United States Patent Office 3,432,426
Patented Mar. 11, 1969

3,432,426
OIL PROCESSOR APPARATUS AND METHOD OF SEPARATING OIL MIXTURE COMPONENTS
Laurence D. Megel, Box 65, Vona, Colo. 80861
Filed Feb. 24, 1966, Ser. No. 529,752
U.S. Cl. 208—187          3 Claims
Int. Cl. C10g 33/06

ABSTRACT OF THE DISCLOSURE

An apparatus is connected to an oil container to separate fluid mixture components by vibratory impulses. The apparatus has a flexible diaphragm mounted on the container, a solenoid connected to the diaphragm and a power supply means connected to the solenoid to provide vibration to the diaphragm. The apparatus is useful for conglomerating and separating water particles suspended in oil.

---

This invention relates to an apparatus used to separate a multi-component fluid mixture, and particularly to a processor apparatus used to separate a multi-component fluid mixture by the use of fluid shock waves. More particularly, this apparatus relates to an oil processor apparatus connectible to an oil storage container and operable to produce shock waves within an oil fluid mixture to conglomerate dispersed colloidal water particles therein.

Various types of fluid separator structures are known to the prior art and include means for setting up a vibrating motion within a fluid mixture. These prior art devices are known to setup a vibratory motion in liquids for cleaning purposes, to remove gaseous particles dispersed within the liquid, and to remove dirt particles from the liquid. The prior art devices are generally structurally complicated, and many instances, require high precision and expensive components in order to achieve a vibrating motion within the fluid mixture. In an oil processor apparatus, it is desirable to maintain a vibratory motion within the oil mixture in order to keep the mixture from jelling at low temperatures and for the purpose of removing water particles dispersed within the mixture as such are detrimental in the processing of oil products from a crude oil mixture.

The present methods of separating fluid mixtures are normally achieved by an equilibrium type process depending on either a mass ratio or mass difference or by a centrifugation type process to separate the heavy component from the light component again on the mass difference principle. However, the cost of centrifugation is high as a large power supply is needed to achieve the separation and the equipment is expensive. Other processes such as thermal and barrier diffusion also have high power cost and such will not be satisfactory for the purposes described herein of separating dispersed water particles from a crude oil mixture.

In the preferred specific embodiments of the invention, an oil process apparatus is provided for connection to an oil container in an oil flow or storage system having a housing member enclosing a power means used to drive a flexible diaphragm assembly which is secured to one end of the housing member. The housing member is of substantially rectangular shape having the diaphragm assembly mounted transversely one end thereof and angularly inclined relative to connecting sidewalls of the housing member. The power means includes an audio generator mounted on a transistorized amplifier which is secured to the bottom wall of the housing member in such a manner that the housing member encloses and provides protection for the power means. The power means further includes a solenoid electrically connected to the amplifier and structurally mounted on a support bracket extended transversely within the housing member and secured to opposite sidewalls thereof. The solenoid has an armature member biased toward the diaphragm assembly by a spring member and connected to the diaphragm assembly by an elongated shaft member. The diaphragm assembly includes a flexible steel diaphragm member mounted in a fluid sealed relationship in the inclined end wall of the housing member between a pair of connector rings by a plurality of bolt members. The shaft member is secured to the mid-portion of the diaphragm member by nut members threaded on the outer connecting end of the shaft member. It is seen that the diaphragm member is facing inwardly and upwardly of the oil storage container whereby the oil fluid mixture contained therein is in contact with the inner surface of the diaphragm member. The power means is connected to a power source, such as a 110 A.C. circuit, to generate audio frequencies which are increased in strength by the amplifier and transmitted to the solenoid whereupon the solenoid is actuated at 15 to 500 cycles per second to move the armature and interconnected shaft outwardly of the oil storage container. Intermediate the solenoid actuation, the shaft and diaphragm members are moved inwardly of the oil storage container under the bias of the spring member whereby the diaphragm member is given a vibratory motion to set up shock waves within the oil fluid mixture in the oil storage container. This sonic or shock wave motion within the oil fluid mixture results in a conglomeration of the colloidal water particles dispersed therewithin causing a separation and settling of these larger groups of water molecules to the bottom of the oil storage container whereupon they form a water line to be periodically drained therefrom.

Accordingly, it is an object of this invention to provide a new and novel oil processor apparatus connectible to an oil storage tank.

Another object of this invention is to provide a new oil processor apparatus having a vibrating diaphragm member adapted to set up shock waves within an oil fluid mixture.

Still another object of this invention is to provide an oil processor apparatus having means for transferring an audio frequency into vibrating motion of a flexible diaphragm means mounted within an oil storage tank.

Still one other object of this invention is to provide an oil processor apparatus operable to create shock wave vibration within an oil storage tank.

One other object of this invention is to provide an oil processor apparatus which is easy to install, inexpensive to manufacture, and substantially maintenance free.

A further object of this invention is to provide a new and novel method of separating a multi-component fluid mixture by shock waves.

A still further object of this invention is to provide a method of separating colloidal water particles from a crude oil mixture by shock waves generated within an oil storage tank.

Various other objects, advantages and features of the invention will become apparent to those skilled in the art from the following discussions, taken in conjunction with the accompanying drawings, in which.

Figure 1:
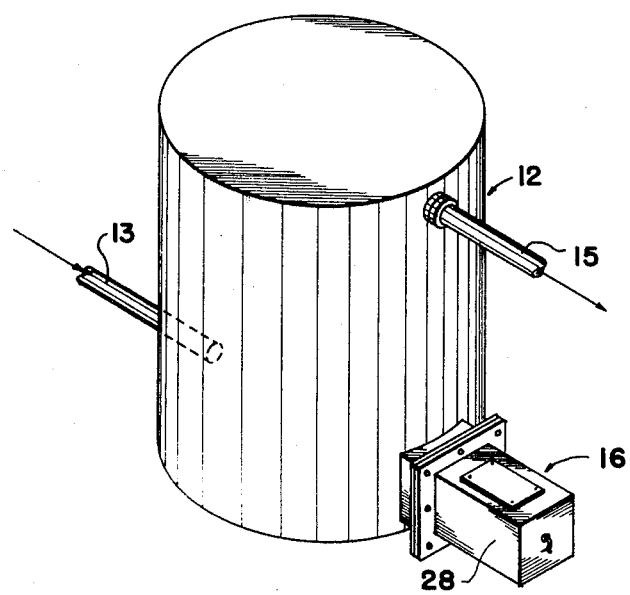
FIG. 1 is a perspective view of an oil storage tank embodying the oil processor apparatus of this invention.

The following is a discussion and description of preferred specific embodiments of the new oil processor apparatus of this invention, and the new method of this invention, such being made with reference to the drawings, whereupon the same reference numerals are used to indicate the same of similar parts and/or structure. It is to be understood that such discussion and description is not to unduly limit the scope of the invention.

Figure 2:
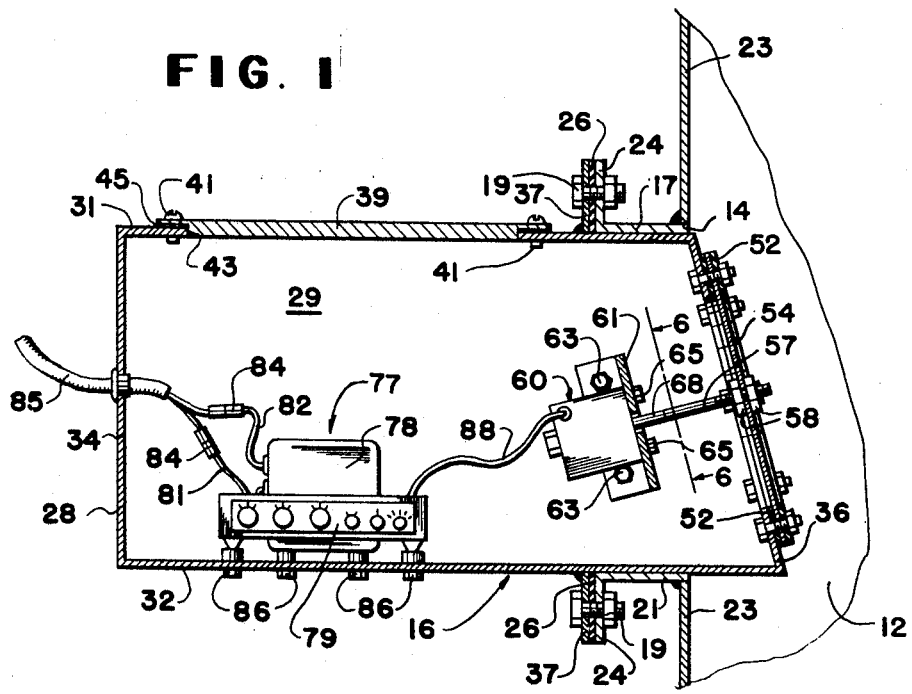
FIG. 2 is an enlarged sectional view of the oil processor apparatus of this invention secured to the sidewall of an oil storage tank.

Referring now to the drawings in detail, and in particular to FIG. 1, a conventional cylindrically shaped oil storage tank indicated generally at 12, is illustrated having an oil inlet line 13 into the lower end portion thereof, an oil inlet line 15 secured to the opposite side upper portion of the oil storage tank 12, and an oil processor apparatus 16 of this invention secured adjacent a lower end of the tank 12 through an opening 14 therethrough. As shown in FIG. 2, the oil processor apparatus 16 is secured to a bracket assembly 17 by a plurality of bolt members 19. The bracket assembly 17 includes a rectangularly shaped box frame 21 secured as by welding to the sidewall 23 of the oil storage tank 12 having a laterally extended connector flange 24 about the outer periphery thereof. A rectangular shaped gasket member 26 similar in shape and size to the flange 24, is mounted between the oil processor apparatus 16 and the flange 24 and held therebetween by the bolt members 19 to prevent fluid leakage from the oil storage tank 12.

Figure 3:
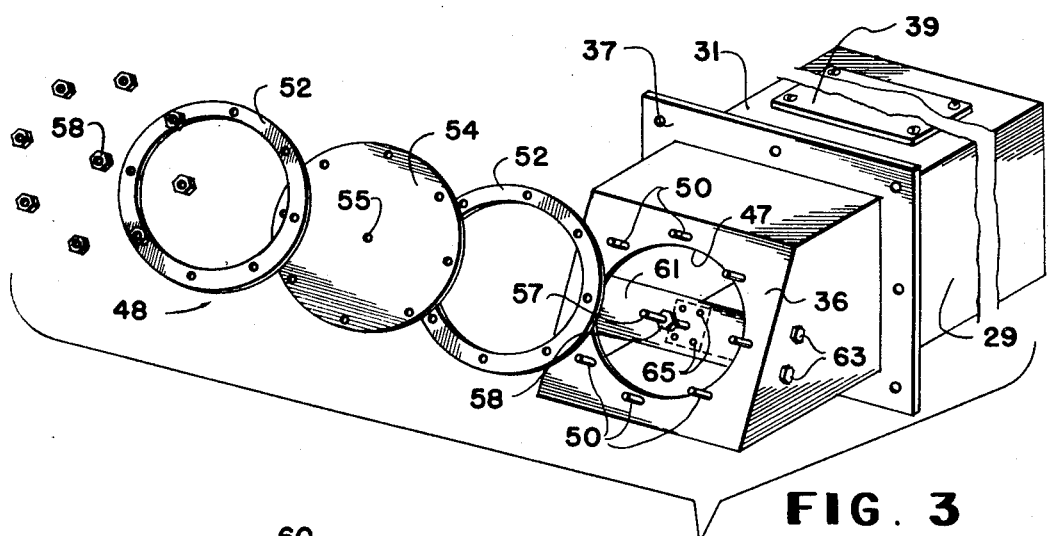
FIG. 3 is a perspective view of the oil processor apparatus of this invention illustrating the diaphragm means thereof in exploded perspective for clarity.

As shown in FIGS. 2 and 3, the oil processor apparatus 16 has a box-like housing 28 of sheet metal construction having parallel sidewalls 29, a top wall 31 and a bottom wall 32 secured to upper and lower edges, respectively of the sidewalls 29, a vertically extended outer end wall 34 secured to adjacent ends of the other walls, and a diaphragm connector plate 36 secured to the opposite ends of the side, top, and bottom walls. The diaphragm connector plate 36 extends angularly relative to the top and bottom walls 31 and 32, respectively, and perpendicular to the sidewalls 29 for reasons to become obvious. A laterally extended rib 37 welded to and extended about the outer peripheral surface of the housing 28 is of a similar shape and size as the flange 24 of the bracket assembly 17 thereby providing a support area used in conjunction with the bolt members 19 to anchor the oil processor apparatus 16 to the oil storage tank 12.

A rectangular plate 39 is releaseably secured to the top wall 31 of the housing 28 by a plurality of screws 41 and covers an enlarged opening 43 used for ease of entrance during repair of the oil processor apparatus 16. A gasket 45 is mounted between the plates 39 and the top wall 31 to prevent moisture from entering the housing 28.

As shown in FIG. 3, the diaphragm connector plate 36 has a large hole or opening 47 centrally positioned therein and adapted to receive a diaphragm assembly 48 to be mounted thereabout by a plurality of bolt members 50. The diaphragm assembly 48 consists of a pair of large sealing rings 52 adapted to clamp a diaphragm member 54 therebetween. The diaphragm member 54 is placed between the sealing rings 52 and the assembly is secured against the diaphragm connector plate 36 by the bolt members 50 which are extended through axially aligned holes in the diaphragm member 54, the rings 52, and diaphragm connector plate 36. Centrally of the diaphragm member 54 is a hole 55 receiving one end of a shaft member 57 connected thereto in a sealing relationship by a pair of nuts 58 each secured against opposite sides of the diaphragm member 54. The shaft member 57 extends outwardly of the diaphragm member 54 with the other end connected to a solenoid 60 which is mounted on a bracket 61. The bracket 61 is constructed of an elongated plate having opposite ends laterally bent in the same direction and secured as by bolts 63 to the opposed housing sidewalls 29. The solenoid 60 is secured to the bracket 61 as by bolts 65 and has an armature member 66 with a rod portion 68 extended transversely of the bracket 61 through a hole 69 therein.

Figure 4:
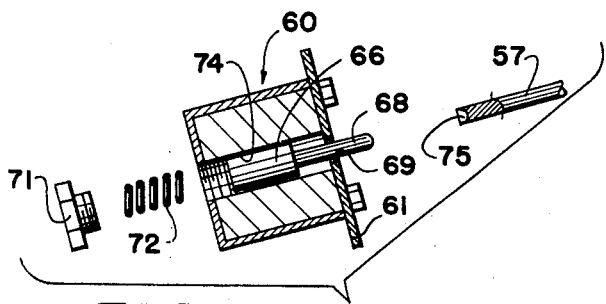
FIG. 4 is a sectional view of a solenoid member showing means for connection to the diaphragm means of this invention.

As shown in FIG. 4, the solenoid 60 has a removable cap member 71 and a spring member 72 mounted within a central bore 74 in the solenoid 60 between the cap member 71 and the armature member 66 to bias the armature member 66 outwardly towards the shaft member 57 and the diaphragm member 54. The rod portion 68 and the shaft member 57 are interconnected by a cup and ball type junction whereupon the rod portion 68 extends within a cup opening 75 in the adjacent end of the shaft member 57.

As shown in FIG. 2, the solenoid 60 is operably connected to a power means 77 which is mounted within the housing 28 and includes a conventional audio generator 78 to which is connected a transistorized pulse amplifier 79. The amplifier 79 and audio generator 78 are connected by conductor lines 81 and 82, respectively, through standard electrical plugs 84 to an electrical supply cable 85 so as to provide electrical power thereto. Additionally, the amplifier 79 is connected by a conductor line 88 to the solenoid 60. The audio generator 78 is mounted on the amplifier 79 which in turn is secured as by bolts 86 to the bottom wall 32 of the housing 28. The audio generator 78 is operable to create electrical impulses of audio frequency which are transmitted to the pulse amplifier 79 and greatly increased to a proper amplitude to drive the solenoid 60 at a selected frequency. The solenoid 60 in turn is connected through the rod portion 68 and the shaft member 57 to the diaphragm member 54 to cause vibratory movement of the diaphragm member 54.

In the use and operation of the oil processor apparatus 16, this unit is mounted in the opening 14 in the side of the oil storage tank 12 and sealed thereto by the cooperation of the flange 24 and the rib 37 with the gasket member 26 mounted therebetween. The audio generator 78 and the amplifier 79 are then connected by the supply cable 85 to an electrical source (not shown) which activates the audio generator 78 to produce electrical impulses which are magnified by the pulse amplifier 79 and conducted by the line 88 to the solenoid 60. The solenoid 60 acts to pull the armature member 66 inwardly or away from the flexible diaphragm member 54 on energization thereof and on de-energization, the armature member 66 is moved outwardly or towards the diaphragm member 54 by the spring member 72 to thereby set up a vibratory or flexing movement of the diaphragm member 54. The amplifier 79 acts to increase the strength of the electrical impulses (15 to 500 cycles per second) of the audio generator 78 to vibrate the solenoid 60 and create shock waves of audio frequency within an oil fluid mixture 90 in the storage tank 12. It is seen that the angular relationship of the diaphragm member 54 with the sidewalls 23 of the oil storage tank 12 operates to direct the shock waves at an upward incline within the oil fluid mixture 90 to transverse the storage tank 12 so as to be regenerated or rebounded off the contacted sidewall 23 of the oil storage tank 12. The sidewalls 23 of the oil storage tank 12 therefor act to rebound and regenerate the shock waves whereby a vibratory motion is set up throughout the entire oil storage tank 12. This vibratory movement in the oil fluid mixture 90 results in a conglomeration of the minute colloidal water particles within the mixture 90 to cause the minute water particles to gather into larger molecules whereupon these larger components tend to settle and separate from the pure oil mixture to form a water level at the bottom of the oil storage tank 12 which can be removed as required through water drainage line 92.

Figure 5:
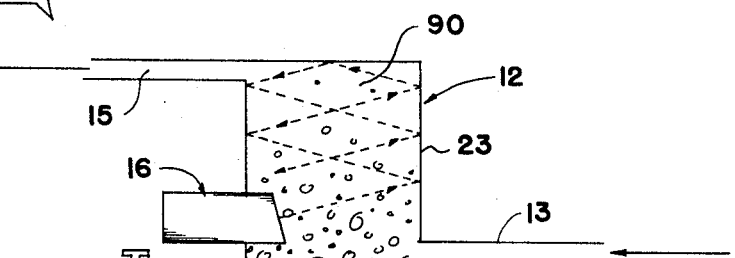
FIG. 5 is a schematic diagram showing the oil processor apparatus of this invention connected to an oil storage tank and being used in a continuous flow process for removing colloidal water particles from an oil fluid mixture.
Figure 6:
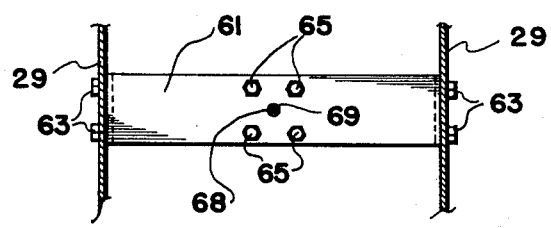
FIG. 6 is a fragmentary sectional view taken along line 6—6 in FIG. 2.

As shown in FIG. 5, the applicants' preferred method of continuously removing colloidal water particles from a multi-component mixture consists of adding the crude oil mixture 90 through the oil inlet line 13 and removing a like quantity of substantially water-free oil from the outlet line 15. Intermediate the oil removal, the oil processor apparatus 16 is operable to create shock waves in the mixture 90 to conglomerate the water particles and cause settling thereof in the storage tank. The resultant water level at the bottom of the tank 12 is periodically removed on opening the drainage line 92 whereby this process operates to continuously separate water particles from a crude oil mixture.

Although the invention has been described and tested with a stainless steel diaphragm member, it is obvious that the oil processor apparatus could be constructed of aluminum for corrosion resistance, plastics to prevent sparks for fireproofing, etc. It is also obvious that applicant's novel apparatus could be used in any number of multi-component fluid mixtures to prevent jelling and cause separation of the components.

As will be apparent from the foregoing description of the preferred embodiments of applicant's oil processor apparatus and method of removing dispersed water particles from an oil mixture, relatively simple and inexpensive processor means have been provided which is readily attachable to an oil storage tank. Applicant's novel structure is simple to operate, inexpensive in use and maintenance, and simple to manufacture. Applicant's processor apparatus presents a practical, inexpensive means of removing water particles from a crude oil mixture usable during the spare time while the mixture is awaiting transfer to an oil processing refinery.

While the invention has been described in connection with preferred specific embodiments thereof, it will be understood that the descriptin is intended to illustrate and not to limit the scope of the invention, which is defined by the following claims.

I claim:

1. An apparatus for separating a multicomponent fluid mixture within a container having fluid inlet and outlet means, comprising:
  (a) transferring means mounted on said container and adapted to contact the fluid mixture for transferring vibration to said mixture,
  (b) power means operable to produce electrical impulses,
  (c) means connecting said power means and said transferring means whereby said impulses generate vibratory motion in said transferring means which produces shock waves in the fluid mixture for component separation thereof,
  (d) said transferring means having a flexible diaphragm member secured to said container whereby one surface of said diaphragm member is in contact with the fluid mixture,
  (e) said connecting means having a solenoid member connected to said power means and said diaphragm member whereby said impulses drive said solenoid member to vibrate said diaphragm member,
  (f) said solenoid member having an armature and a spring member biasing said armature toward said diaphragm member, and
  (g) said connecting means including a shaft member having one end secured to said diaphragm member and the other end connected to said armature whereby said spring member biases said diaphragm member in one direction and said solenoid member is energized by said impulses to flex said diaphragm member in the opposite direction to set up shock waves in the fluid mixtures.

2. An apparatus as described in claim 1, wherein:
  (a) said diaphragm member facing upwardly inclines relative a sidewall within said container whereby the shock waves produced by said diaphragm member are rebounded from side to side of said container.

3. A method of separating a fluid mixture having colloidal of water particles suspended in an oil fluid medium carried in a container, comprising:
  (a) generating electrical impulses,
  (b) conveying said impulses to an amplifier,
  (c) increasing said impulses by said amplifier,
  (d) conveying said increased impulses to a solenoid member for vibratory movement thereof, and
  (e) vibrating said solenoid member which is connected to a diaphragm member mounted on said container, said diaphragm member having one surface in contact with the fluid medium whereby said diaphragm member is vibrated to set up shock waves of a given magnitude in the fluid mixture to separate the water particles by conglomeration.

References Cited

UNITED STATES PATENTS

| 1,942,480 | 1/1934 | Lawrason | 204—307 |
| 2,766,881 | 10/1956 | Westervelt et al. | 210—19 |
| 3,109,721 | 11/1963 | Zenner et al. | 210—19 |
| 3,124,528 | 3/1964 | Wood | 210—19 |

DELBERT E. GANTZ, *Primary Examiner.*

G. J. CRASANAKIS, *Assistant Examiner.*

U.S. Cl. X.R.

204—307; 210—19